July 15, 1930.  L. C. BLOMSTROM  1,770,728
BROACHING TOOL
Filed July 18, 1927  2 Sheets-Sheet 1

Inventor
Lowell C. Blomstrom
By Swan, Frye and Murray
Attorneys

July 15, 1930.  L. C. BLOMSTROM  1,770,728
BROACHING TOOL
Filed July 18, 1927   2 Sheets-Sheet 2

Inventor
Lowell C. Blomstrom
By Swan Frye and Murray
Attorneys

Patented July 15, 1930

1,770,728

UNITED STATES PATENT OFFICE

LOWELL C. BLOMSTROM, OF DETROIT, MICHIGAN, ASSIGNOR TO FEDERAL MOGUL CORPORATION, OF DETROIT, MICHIGAN, A CORPORATION OF MICHIGAN

BROACHING TOOL

Application filed July 18, 1927. Serial No. 206,532.

This invention relates to an improved broaching tool, particularly adapted for work upon what are known as half bearings or split shells, and has for its object an improved organization of parts which, whether integral in the first instance, or in a built-up form, as will be hereinafter described, embodies a high degree of possible accuracy of cut and, in one form, a possibility of modification or slight adjustment of the parts to provide what is known as a relief cut in the broaching of the half bearing.

Figure 1:
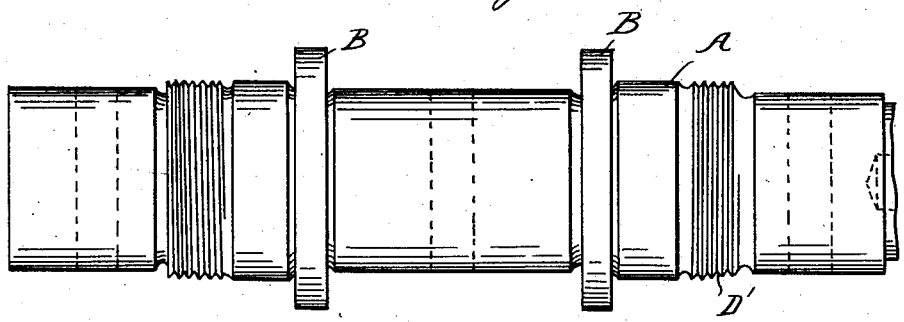
Figure 1 is a side elevational view of the simpler form of my improved broaching tool.
Figure 2:
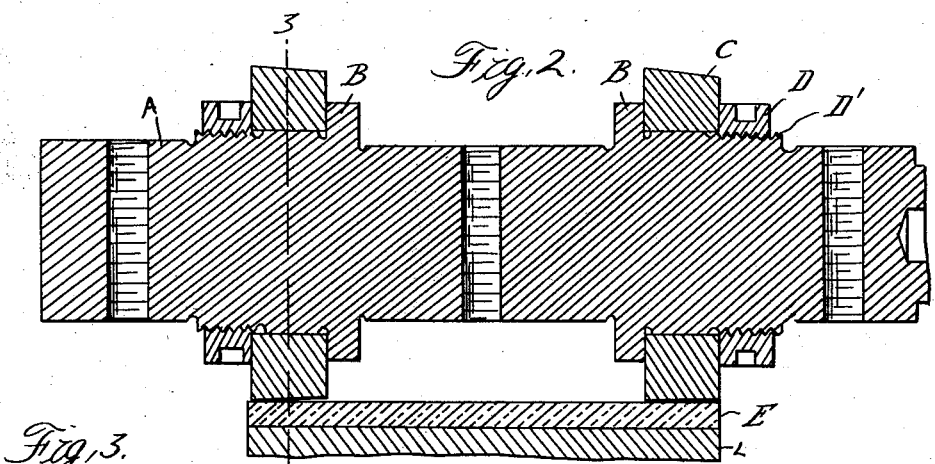
Figure 2 is a side sectional elevational view showing the cutter members in place.
Figure 3:
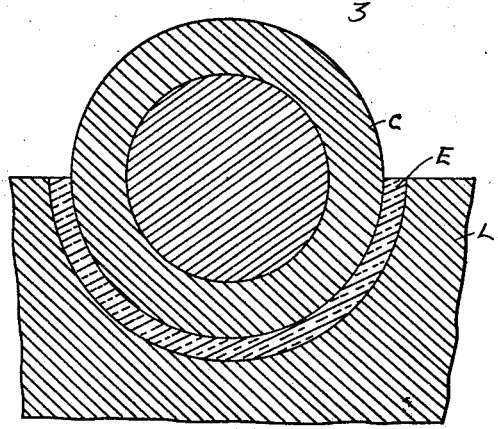
Figure 3 is a cross-sectional view taken along the line 3—3 of Figure 2.

A indicates the stem or arbor of a broaching tool, which may be either made integral in the first instance, that is, machined from a single piece of steel, or may be built up from various accurately aligned parts. It is provided with stops B, against which high steel broaching elements C may be fitted, these latter being held in position by threaded collars D which engage over complementarily threaded portions D' on the arbor A. At E is shown in cross section the whole of the half bearing, whose surface is adapted to be broachingly engaged by the members C as the broaching tool is forced axially lengthwise of the bearing, when the latter has been clamped in a suitable holding block L, accurately positioned with reference to the path of travel of the broaching tool. The action of this type of broaching members with reference to the half bearing is further brought out in cross sectional Figure 3, where the outer surface of the half bearing and its broached inner surface, the broaching surfaces of the tools C, and the broaching tool as a whole are all absolutely coaxial.

Figure 4:
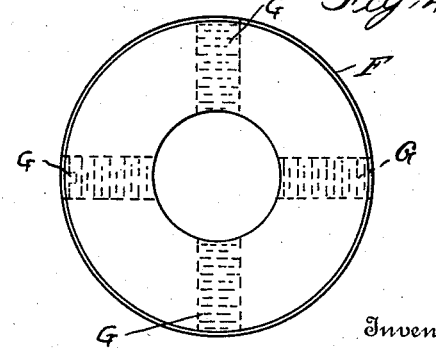
Figure 4 is an elevational view of the relief cutter member taken at right angles to the position of the tool illustrated in Figures 1 and 2.
Figure 5:
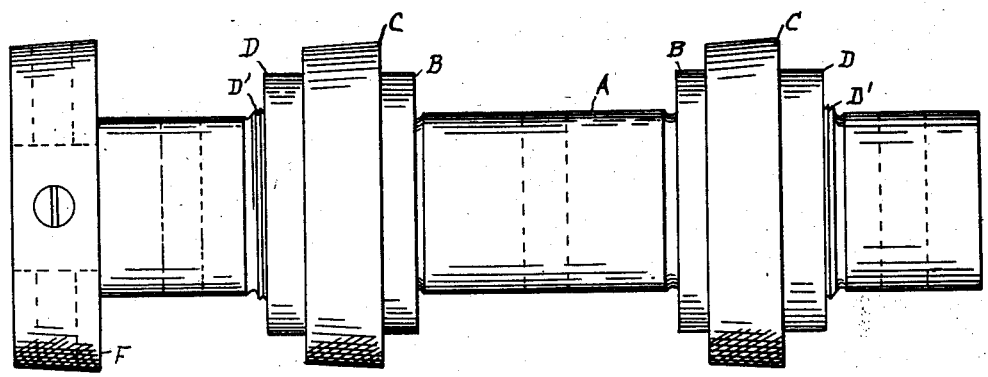
Figure 5 is a side elevational view of a broaching tool with this relief cutter shown in position therein.
Figure 6:
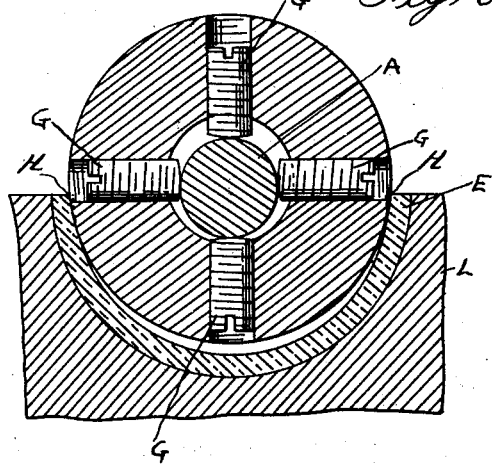
Figure 6 is a cross-sectional elevational view of the relief cutter itself and of a half bearing and of a portion of its holding block in position relatively thereto, showing the position of the additional broaching effect produced upon the half bearing by the relief broaching tool after the other broaching members have completed their work.

It often happens, however, that an additional, almost infinitesimal cut or broaching off of the concaved surface of the half bearing is desired immediately adjacent its straight edge portions, in order to provide for very slight inbending of the half bearing shell in a subsequent shop operation not necessary to here review in detail. To this end, I provide on the broaching arbor A an additional broaching element or relief cutter F, which comes into action after the cutters C have finished their work. As brought out in Figures 4 and 6 particularly, this relief cutter F is slightly adjustable relatively to the axis of the arbor A as a whole by means of the screws or adjusting stops G, whereby it may be rendered eccentric relative to the arbor A. It may thus be thrown so that its cutting surface only touches the inner surfaces of the bearing shell just inside of its straight edges, and the arbor F being of sufficiently greater diameter than the elements C which have already performed their work, acts to make a slight cut on each side of the bearing shell which I have indicated at H in Figure 6. Actually this is of far smaller degree relatively to the proportions of the bearing shell than is here shown, but I have exaggerated the illustration for the sake of clearness. Both the ordinary broaching operation effected by the members C and this relief cut upon the selected portions of the interior surface of the half bearing E can thus be performed at a single broaching operation.

It is also to be observed that during each broaching operation only the lower half of the completely circular broaching tool is in active service. It is an additional advantage of my improved construction that whenever the initially active half of the broaching elements become worn or otherwise impaired by the broaching arbor it and its other support elements can be given a half-turn and an entirely new set of broaching surfaces thus provided without disassembling the mechanism, other than readjustment of the relief cutter to a position diametrically opposite the axial center to that which it first occupied and of course to the same radial distance therefrom.

What I claim is:

1. A built-up broaching tool, having, in combination with a supporting arbor, a plurality of axially aligned parts of variant diameter positioned thereon in initial coaxial alignment whereby a plurality of longitudinally spaced cutting surfaces are provided, one of which is capable of selective axial displacement to minute dimensional specifications, whereby the net cutting effect of the several active surfaces, when the tool is moved axially lengthwise, is a component of their individual peripheral contours.

2. A broaching tool comprising a carrying arbor, and a plurality of circular cutter elements spacedly positioned thereon and individually removable therefrom, one of said cutter elements being capable of adjustment to axially eccentric position relatively to the other cutter elements and to the arbor.

3. In a broaching tool, in combination with a carrying arbor, plain circular cutter members spacedly positioned thereon, and a relief circular cutter member also carried thereby and capable of adjustment to various positions of eccentricity relatively to the axis of the arbor and of the plain cutter members.

4. In a broaching tool, the combination, with a carrying arbor, of circular cutter elements spacedly positioned thereon, and means incorporated with one of said cutter elements whereby it may be adjusted to various positions of eccentricity relatively to the axis of the carrying arbor and of the other cutter elements.

5. In a broaching tool, in combination with a carrying arbor, removable cutter members spacedly engaging thereabout in position of continuous coaxality relatively to said carrying arbor, and an encircling relief cutter member also carried by said arbor and adapted to be moved to selected positions of axial eccentricity relatively thereto and to said first named cutter members.

6. In a broaching tool, the combination, with a carrying arbor, of a plurality of circular cutter members removably positioned therealong, certain of said cutter members being incapable of displacement from positions of coaxality with said carrying arbor, and one of said cutters being adapted to be adjusted to varying positions of eccentricity with respect to the axis of said carrying arbor and of said first named cutters, and means for individually securing said cutters in position on said carrying arbor.

7. A broaching tool, having, in combination with a supporting arbor, a coaxially disposed circular broaching member removably positioned thereon, a supplemental broaching member of slightly greater diameter than the first named broaching member also removably positioned about said arbor, and means carried by said supplemental broaching member within its peripheral line of possible cutting action, whereby it may be regulatably positioned for cutting action eccentrically to the line of operative activity of the first named broaching member.

In testimony whereof I sign this specification.

LOWELL C. BLOMSTROM.